United States Patent [19]
Yamazaki

[11] Patent Number: 5,956,082
[45] Date of Patent: *Sep. 21, 1999

[54] VIDEO SIGNAL PROCESSING APPARATUS

[75] Inventor: Yasuyuki Yamazaki, Chiba-ken, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/603,633

[22] Filed: Feb. 20, 1996

[30] Foreign Application Priority Data

Feb. 24, 1995 [JP] Japan .................................... 7-037130

[51] Int. Cl.⁶ ............................ H04N 5/30; H04N 5/74
[52] U.S. Cl. ........................ 348/222; 348/220; 348/792; 348/208
[58] Field of Search .................................. 348/220, 441, 348/443, 445, 452, 458, 559, 792, 793, 222, 208, 231; H04N 7/01, 5/30, 5/74, 5/76

[56] References Cited

U.S. PATENT DOCUMENTS

| | | | |
|---|---|---|---|
| 4,546,390 | 10/1985 | Konishi et al. | 348/220 |
| 4,780,764 | 10/1988 | Kinoshita et al. | 348/220 |
| 4,837,628 | 6/1989 | Sasaki | 348/220 |
| 5,003,388 | 3/1991 | Shirochi et al. | 348/458 |
| 5,267,045 | 11/1993 | Stroomer | 348/241 |
| 5,274,458 | 12/1993 | Kondo et al. | 348/222 |
| 5,301,031 | 4/1994 | Eto et al. | 348/792 |
| 5,371,539 | 12/1994 | Okino et al. | 348/222 |
| 5,617,138 | 4/1997 | Ito et al. | 348/222 |

OTHER PUBLICATIONS

K. Blair Benson's "Television Engineering Handbook" Jun. 5, 1986, p. 21.6.

*Primary Examiner*—Glenton B. Burgess
*Attorney, Agent, or Firm*—Robin, Blecker & Daley

[57] ABSTRACT

A video signal processing apparatus is arranged to input a video signal in which one frame is composed of a plurality of fields and scanning lines are interlaced among the plurality of fields, selectively take a mode for sequentially outputting video signals of a plurality of fields of a frame and a mode for consecutively outputting a video signal of one of the plurality of fields by a plurality of times, and output the video signal thus processed to a display device having displayable scanning lines the number of which is smaller than the number of scanning lines per field of the input video signal. With the above-described arrangement, even if a video signal in which scanning lines are interlaced is supplied to a display device having a comparatively small number of displayable scanning lines, it is possible to obtain a display image free from a vertical image shake.

39 Claims, 6 Drawing Sheets

VIDEO SIGNAL PROCESSING APPARATUS

BACKGROUND OF THE INVENTION

1. Field of the Invention

The present invention relates to a video signal processing apparatus and, more particularly, to a video signal processing apparatus for receiving a video signal in which scanning lines are interlaced and supplying a video signal corresponding to the line-interlaced video signal to a display device having a comparatively small number of displayable scanning lines.

2. Description of the Related Art

FIG. 1 is a block diagram of a conventional electronic camera provided with a liquid crystal display device for displaying an image. The electronic camera shown in FIG. 1 includes an image pickup part 11 composed of predetermined constituent elements such as a lens for gathering subject light and a solid-state image pickup element, such as a CCD, for converting the subject light into an electrical signal, a recording signal processing circuit 12 for converting an output signal from the image pickup part 11 into a predetermined recordable signal format, a recording medium 13, such as tape, disc or semiconductor memory, for recording a video signal representative of a picked-up image, a reproduced signal processing circuit 14 for converting a video signal recorded on the recording medium 13 into a predetermined signal format for output to the outside, such as the original signal format, an external output terminal 15 from which to output a reproduced video signal, a switch circuit 16 and switch control means 17.

When a recording mode is selected by the switch control means 17, the switch circuit 16 is connected to a terminal "a" and outputs a signal supplied from the recording signal processing circuit 12 in a signal format suitable for display, for example, a signal format conforming to a television signal format. Such signal is a video signal representative of an image picked up by the image pickup part 11. When a reproduction mode is selected by the switch control means 17, the switch circuit 16 is connected to a terminal "b" and outputs a signal supplied from the reproduced signal processing circuit 14 in a signal format suitable for display. Such signal is a video signal read from the recording medium 13. The electronic camera shown in FIG. 1 also includes a display signal processing circuit 18 for converting an output from the switch circuit 16 into a signal having a predetermined format available for display provided by a liquid crystal display device 19, and the liquid crystal display device 19 for displaying an image represented by an input signal.

The operation of the electronic camera having the above-described construction will be described below.

During the recording mode (photographing mode), a photographed subject image is converted into an electrical video signal by the image pickup part 11, and after this video signal has been converted into a signal having the predetermined signal format by the recording signal processing circuit 12, the signal is recorded on the recording medium 13. At this time, the switch circuit 16 is connected to the terminal "a" by the switch control means 17 so that the video signal supplied from the recording signal processing circuit 12 is applied to the display signal processing circuit 18. The display signal processing circuit 18 converts the video signal into a signal having the predetermined format available for display, and the liquid crystal display device 19 visually displays the signal. Thus, an observer can monitor the image which is presently being picked up.

During the reproduction mode, a video signal reproduced from the recording medium 13 is converted into a signal having the predetermined signal format by the reproduced signal processing circuit 14, and the signal is supplied from the external output terminal 15 to an external apparatus or the like. At this time, the switch circuit 16 is connected to the terminal "b" by the switch control means 17 so that the reproduced video signal supplied from the reproduced signal processing circuit 14 is applied to the display signal processing circuit 18. Thus, the reproduced video signal is visually displayed by the liquid crystal display device 19, so that the observer can monitor the image which is presently being reproduced.

The liquid crystal display device 19 used in the conventional electronic camera has a high degree of pixel density, but, because of technical or manufacturing limitations, in many liquid crystal display devices, the number of displayable horizontal scanning lines is 220 to 240 which is approximately half the number of effective horizontal scanning lines, i.e., 480, in the case of, for example, television signals of NTSC system. The liquid crystal display device 19 having such a construction is arranged to display one frame image in the following manner. Since the odd field image of the frame image has 240 effective horizontal scanning lines, the odd field image is first sequentially written to all of the 240 horizontal scanning lines of the liquid crystal display device 19 during the period of the odd field. Then, since the even field image of the frame image also has 240 effective horizontal scanning lines, the even field image is sequentially written to all of the 240 horizontal scanning lines of the liquid crystal display device 19 during the period of the even field. Accordingly, if the frame image is to be displayed by the liquid crystal display device 19, the odd field image and the even field image are written to the same horizontal scanning lines.

As is known, such a television signal of NTSC system is formed by interlaced scanning and the odd and even field images are deviating from each other by one horizontal scanning line. As a result, since these field images are written to the same horizontal scanning lines of the liquid crystal display device as in the case of the above-described conventional example, a displayed image will be vertically shaken at intervals of one field. In particular, when a still image is displayed, this problem conspicuously appears.

SUMMARY OF THE INVENTION

It is, therefore, an object of the present invention to solve the above-described problems.

Another object of the present invention is to provide a video signal processing apparatus which is capable of producing a display image free from a vertical image shake even in the case of receiving a video signal in which scanning lines are interlaced and supplying a video signal corresponding to the line-interlaced video signal to a display device having a comparatively small number of displayable scanning lines.

To achieve the above-described object, according to one aspect of the present invention, there is provided a video signal processing apparatus which comprises input means for inputting a video signal in which one frame is composed of a plurality of fields and scanning lines are interlaced among the plurality of fields, processing means for processing the video signal inputted by the input means, the processing means selectively taking a first mode for sequentially outputting video signals of a plurality of fields of a frame and a second mode for consecutively outputting a video signal of one of the plurality of fields by a plurality of times, and output means for outputting the video signal processed by the processing means to a display device having displayable scanning lines the number of which is smaller than the number of scanning lines per field of the input video signal.

The above and other objects, features and advantages of the present invention will become apparent from the following detailed description of preferred embodiments of the present invention, taken in conjunction with the accompanying drawings.

DETAILED DESCRIPTION OF THE PREFERRED EMBODIMENTS

Figure 1:
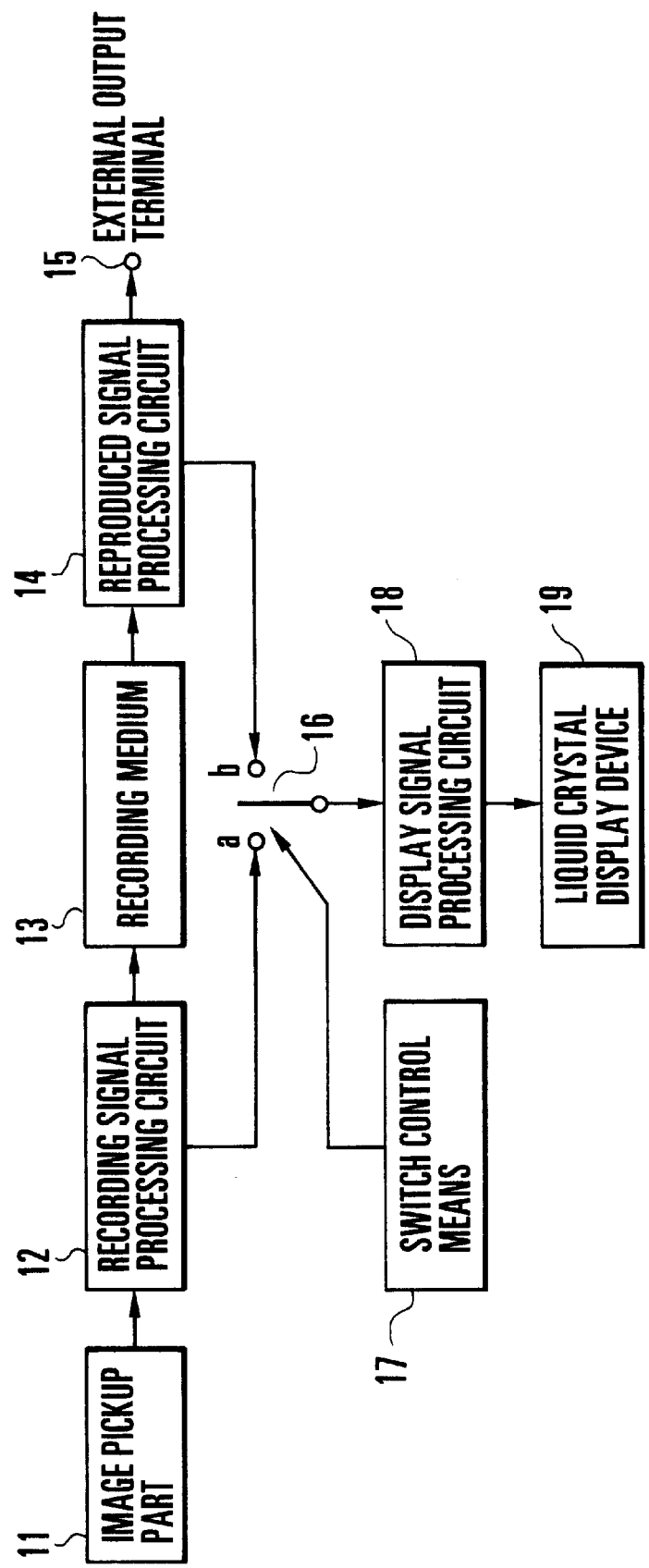
FIG. 1 is a block diagram showing an example of the construction of a general electronic camera.

Preferred embodiments of the present invention will be described below with reference to FIGS. 2 to 6. In FIGS. 2 to 6, identical reference numerals are used to denote parts substantially corresponding to those shown in FIG. 1, and the description thereof is omitted for the sake of simplicity.

Figure 2:
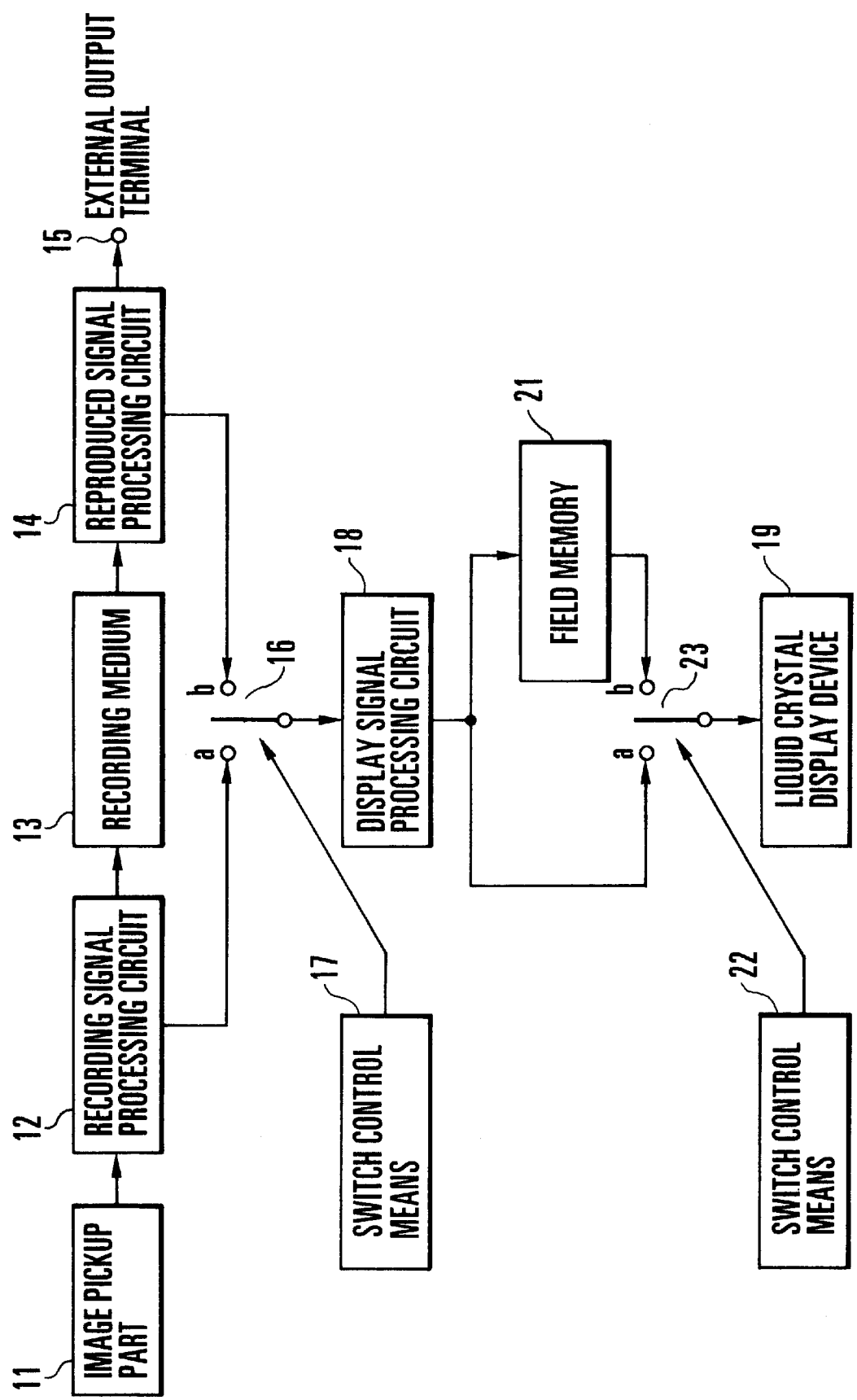
FIG. 2 is a block diagram showing the construction of an electronic camera according to a first embodiment of the present invention.

FIG. 2 is a block diagram of an electronic camera provided with a display device and a recording and reproducing device, according to a first embodiment of the present invention.

The electronic camera shown in FIG. 2 includes a field memory 21 for storing an image outputted from a display signal processing circuit 18, switch control means 22, and a switch circuit 23 for selectively applying an image outputted from the display signal processing circuit 18 and an image outputted from the field memory 21 to a liquid crystal display device 19 under the control of the switch control means 22.

The operation of the electronic camera according to the first embodiment of the present invention will be described below with reference to FIG. 2. If the electronic camera is set to its recording mode by switch control means 17, an image, which has been picked up and converted into an electrical signal by an image pickup part 11, is converted into a predetermined recordable signal format by a recording signal processing circuit 12 and is then recorded on the recording medium 13. Simultaneously, a switch circuit 16 is connected to a terminal "a" by the switch control means 17, and a signal representative of the image which is being picked up is inputted into the display signal processing circuit 18 in a signal format conforming to a television signal format. The display signal processing circuit 18 converts the input image into a predetermined format available for display provided by the liquid crystal display device 19. The output from the display signal processing circuit 18 is inputted to the terminal "a" of the switch circuit 23 and the field memory 21. The image is delayed by one field in the field memory 21, and is then inputted to a terminal "b" of the switch circuit 23. The switch circuit 23 is controlled by the switch control means 22 in a manner which will be described later. The output from the switch circuit 23 is inputted to and visually displayed by the liquid crystal display device 19.

If the electronic camera is set to its reproduction mode by the switch control means 17, an image is read from the recording medium 13 and is converted into a predetermined signal format for output to the outside by a reproduced signal processing circuit 14. The signal converted into the predetermined signal format is outputted from an external output terminal 15. Simultaneously, the switch circuit 16 is connected to a terminal "b" by the switch control means 17, and the image read from the recording medium 13 is inputted to the display signal processing circuit 18 in the signal format conforming to the television signal format. Since the subsequent operations are similar to those performed during the recording mode, the description thereof is omitted.

If a frame display mode is selected by the switch control means 22, the switch circuit 23 is controlled to be at all times connected to the terminal "a". Accordingly, a frame image outputted from the display signal processing circuit 18 is displayed by the liquid crystal display device 19. As described previously, the number of horizontal scanning lines of the liquid crystal display device 19 is approximately half the number of effective horizontal scanning lines, for example, 220 to 240 in the case of the NTSC system, and if the frame image is inputted to the liquid crystal display device 19, the odd field image of the frame image is first written to all the horizontal scanning lines of the liquid crystal display device 19 and the even field image of the frame image is then written to all the same horizontal scanning lines. Accordingly, the odd field image and the even field image are written to the same horizontal scanning lines.

If a field display mode is selected by the switch control means 22, the switch circuit 23 is controlled to be alternately connected to the terminals "a" and "b" at intervals of one field. Accordingly, when the switch circuit 23 is connected to the terminal "a", the output from the display signal processing circuit 18 is directly inputted to the liquid crystal display device 19, whereas when the switch circuit 23 is connected to the terminal "b", an image which is delayed by one field in the field memory 21 is inputted to the liquid crystal display device 19.

In other words, the image inputted to the liquid crystal display device 19 is obtained by forming either one of the odd and even field images into two consecutive field images through pre-interpolation. When such image is inputted to the liquid crystal display device 19, the two field images obtained from either one of the odd and even field images are consecutively written to the same horizontal scanning lines.

As described above, the frame display mode and the field display mode are provided as two different switchable display modes in either of which the liquid crystal display device 19 can display an image. Accordingly, if an observer feels it undesirable that the conventional problem with the frame display mode, i.e., a vertical image shake, is caused by writing odd and even field images to the same horizontal scanning lines, the observer can select the field display mode and eliminate the vertical image shake because the same image is written to the same horizontal scanning lines.

Although in the first embodiment the field memory 21 is used to execute the field display mode, it is, of course, possible to achieve a similar effect by writing every second field image to the liquid crystal display device 19 and holding the written field image for a two-field period by using the image holding function of the liquid crystal display device 19.

Figure 3:
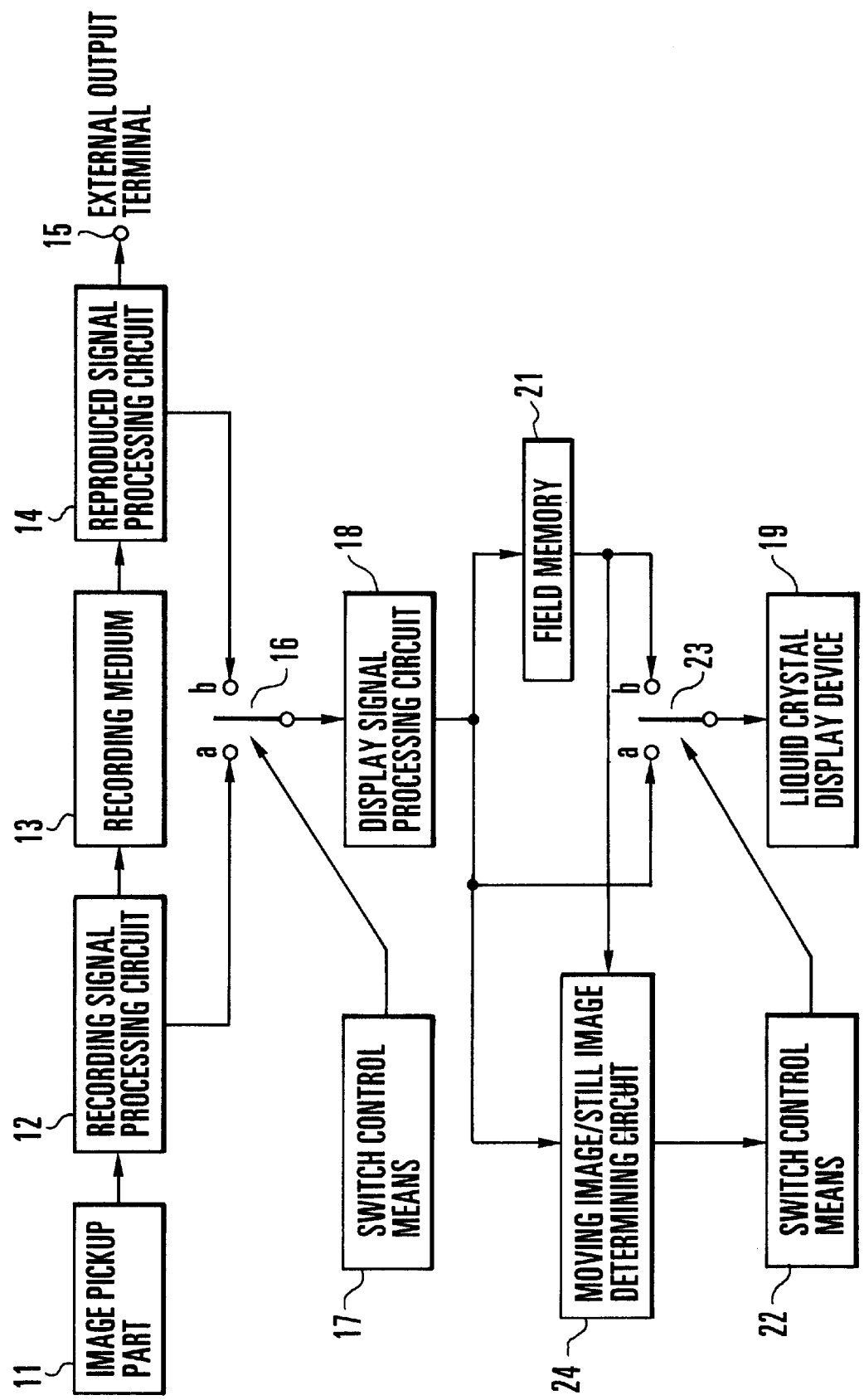
FIG. 3 is a block diagram showing the construction of an electronic camera according to a second embodiment of the present invention.

FIG. 3 is a block diagram showing an electronic camera provided with a display device and a recording and reproducing device, according to a second embodiment of the present invention. In FIG. 3, reference numeral 24 denotes a moving image/still image determining circuit for determining whether an image to be displayed is a moving image or a still image and controlling the switch control means 22 on the basis of the decision result.

The operation of the electronic camera according to the second embodiment of the present invention will be described below with reference to FIG. 3.

The output from the display signal processing circuit 18 is inputted to the field memory 21 and the switch circuit 23 similarly to the first embodiment, and is also inputted to the moving image/still image determining circuit 24. Further, the image which is delayed by one field in the field memory 21 is inputted to the moving image/still image determining circuit 24. The moving image/still image determining circuit 24 determines whether the input image is a moving image or a still image, from the correlation between the consecutive field images of the input image, and controls the switch control means 22 on the basis of the decision result. Since this kind of determining circuit is known as an interfield motion detecting circuit, the detailed description of the construction of the moving image/still image determining circuit 24 is omitted herein.

Specifically, if the moving image/still image determining circuit 24 determines that an image to be displayed is a moving image, the switch control means 22 selects the frame display mode and controls the switch circuit 23 so that the switch circuit 23 is at any times connected to the terminal "a". Thus, a frame image outputted from the display signal processing circuit 18 is inputted to the liquid crystal display device 19.

In the liquid crystal display device 19, the odd field image of the input frame image is first written to all the horizontal scanning lines, and the even field image is then written to all the same horizontal scanning lines. Accordingly, the odd field image and the even field image are written to the same horizontal scanning lines.

If the moving image/still image determining circuit 24 determines that an image to be displayed is a still image, the switch control means 22 selects the field display mode and controls the switch circuit 23 so that the switch circuit 23 is alternately connected to the terminals "a" and "b" at intervals of one field. When the switch circuit 23 is connected to the terminal "a", the output from the display signal processing circuit 18 is directly inputted to the liquid crystal display device 19, whereas when the switch circuit 23 is connected to the terminal "b", an image which is delayed by one field in the field memory 21 is inputted to the liquid crystal display device 19. In other words, the image inputted to the liquid crystal display device 19 is obtained by forming either one of the odd and even field images into two consecutive field images through pre-interpolation. When such image is inputted to the liquid crystal display device 19, the two field images obtained from either one of the odd and even field images are consecutively written to the same horizontal scanning lines.

As described above, the second embodiment is provided with determining means for determining whether an image to be displayed is a moving image or a still image. If the determining means determines that an image to be displayed is a moving image, the image is displayed in the frame display mode so as to preferentially ensure a moving-image resolution, because the vertical image shake of the moving image due to the frame display mode is inconspicuous owing to the motion of the moving image itself. If the determining means determines that an image to be displayed is a still image, the image is displayed in the field display mode so as to prevent occurrence of a vertical image shake, because the still image has no motion and its vertical image shake due to the frame display mode is conspicuous. Accordingly, it is possible to automatically display an image in an optimum display mode suited to the kind of image to be displayed.

Figure 4:
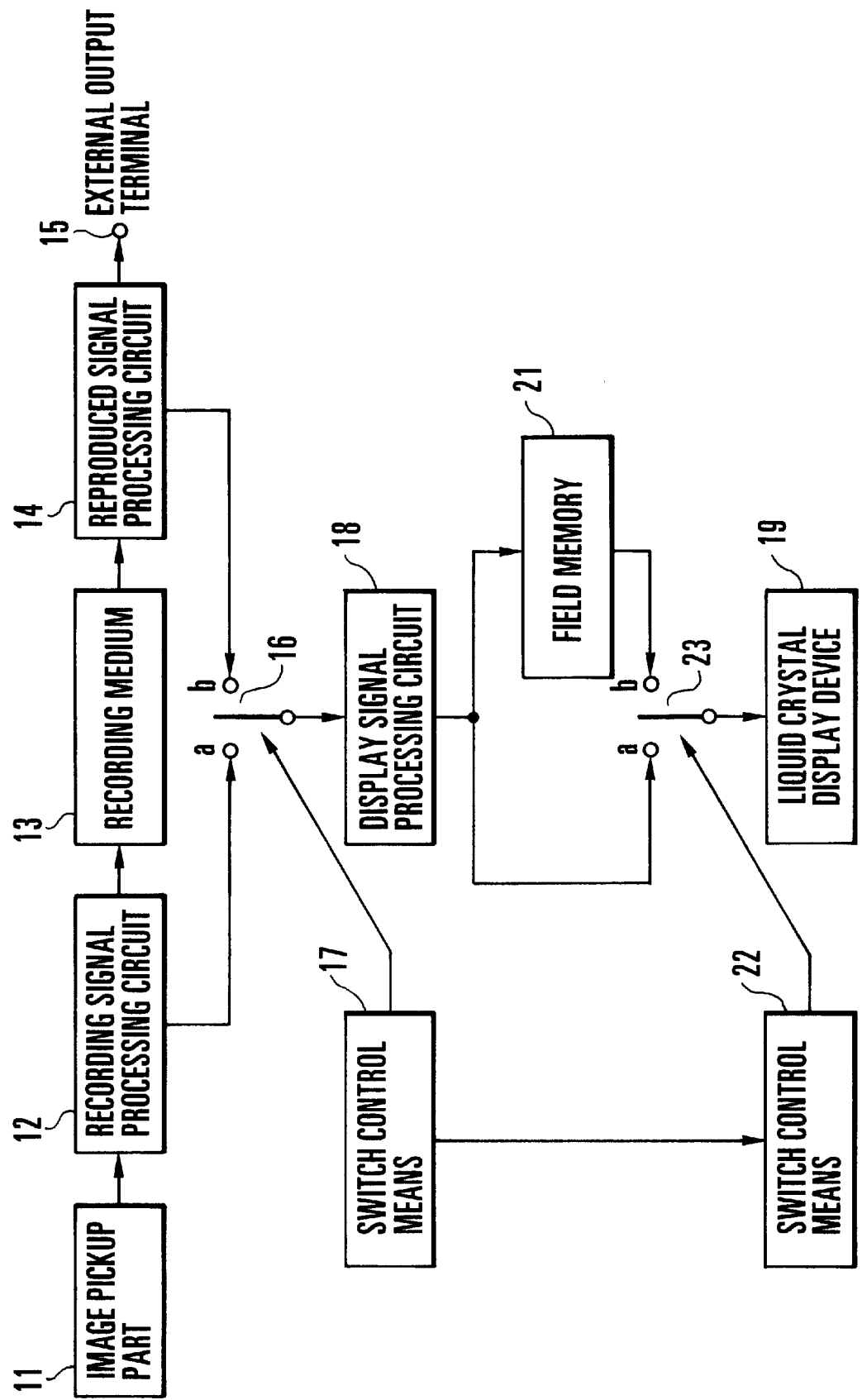
FIG. 4 is a block diagram showing the construction of an electronic camera according to a third embodiment of the present invention.

FIG. 4 is a block diagram of an electronic camera provided with a display device and a recording and reproducing device, according to a third embodiment of the present invention.

The electronic camera shown in FIG. 4 according to the fourth embodiment is arranged to pick up an image of a subject and record a still image representative of the picked-up image. In the electronic camera shown in FIG. 4, when the recording mode is selected by the switch control means 17, an image obtained by the image pickup part 11 is supplied to the switch circuit 16 via the recording signal processing circuit 12. Similarly to the first embodiment, the switch circuit 16 is connected to the terminal "a" by the switch control means 17 and the image is inputted to the display signal processing circuit 18. The output from the display signal processing circuit 18 is displayed in a predetermined mode by the liquid crystal display device 19 under the control of the switch control means 22.

Further, if a release switch (not shown) is pressed, the still image obtained from the image pickup part 11 is recorded on the recording medium 13. In addition, if the reproduction mode is selected by the switch control means 17, the still image read from the recording medium 13 is outputted to the external output terminal 15 and the switch circuit 16 via the reproduced signal processing circuit 14. The switch circuit 16 is controlled to be connected to the terminal "b", by the switch control means 17, and the still image is inputted to the display signal processing circuit 18 and the output therefrom is displayed by the liquid crystal display device 19.

At this time, if the recording mode is selected by the switch control means 17, the switch control means 22 is controlled to select the frame display mode, by a control signal supplied from the switch control means 17, and the switch circuit 23 is controlled to be at all times connected to the terminal "a". Then, a moving image obtained by the image pickup part 11 is inputted to the liquid crystal display device 19. In the liquid crystal display device 19, the odd field image of the input frame image is first written to all the horizontal scanning lines, and the even field image is then written to all the same horizontal scanning lines. Accordingly, the odd field image and the even field image are written to the same horizontal scanning lines.

If the reproduction mode is selected by the switch control means 17, the switch control means 22 is controlled to select the field display mode, by a control signal supplied from the switch control means 17, and controls the switch circuit 23 so that the switch circuit 23 is alternately connected to the terminals "a" and "b" at intervals of one field. When the switch circuit 23 is connected to the terminal "a", the output from the display signal processing circuit 18 is directly inputted to the liquid crystal display device 19, whereas when the switch circuit 23 is connected to the terminal "b", an image which is delayed by one field in the field memory 21 is inputted to the liquid crystal display device 19. Accordingly, the still image read from the recording medium 13 and inputted to the liquid crystal display device 19 is obtained by forming either one of the odd and even field images into two consecutive field images through pre-interpolation. When such image is inputted to the liquid crystal display device 19, the two field images obtained from either one of the odd and even field images are consecutively written to the same horizontal scanning lines.

As described above, in the electronic camera arranged to record a still image, during recording, since an image to be displayed is a moving image, the image is displayed in the frame display mode so as to preferentially ensure a moving-image resolution similarly to the second embodiment, whereas during reproduction, since an image to be displayed is a still image, the image is displayed in the field display mode so as to prevent occurrence of a vertical image shake. Accordingly, it is possible to automatically display an image in an optimum display mode according to either of the recording and reproduction modes.

As is known, in a particular type of liquid crystal display device, the level of a signal to be applied to each pixel needs to be inverted with respect to a predetermined potential (common electrode potential: +0.2 V to 0.5 V) at intervals of a predetermined period (for example, one horizontal scanning period: 1 H).

Figure 5:
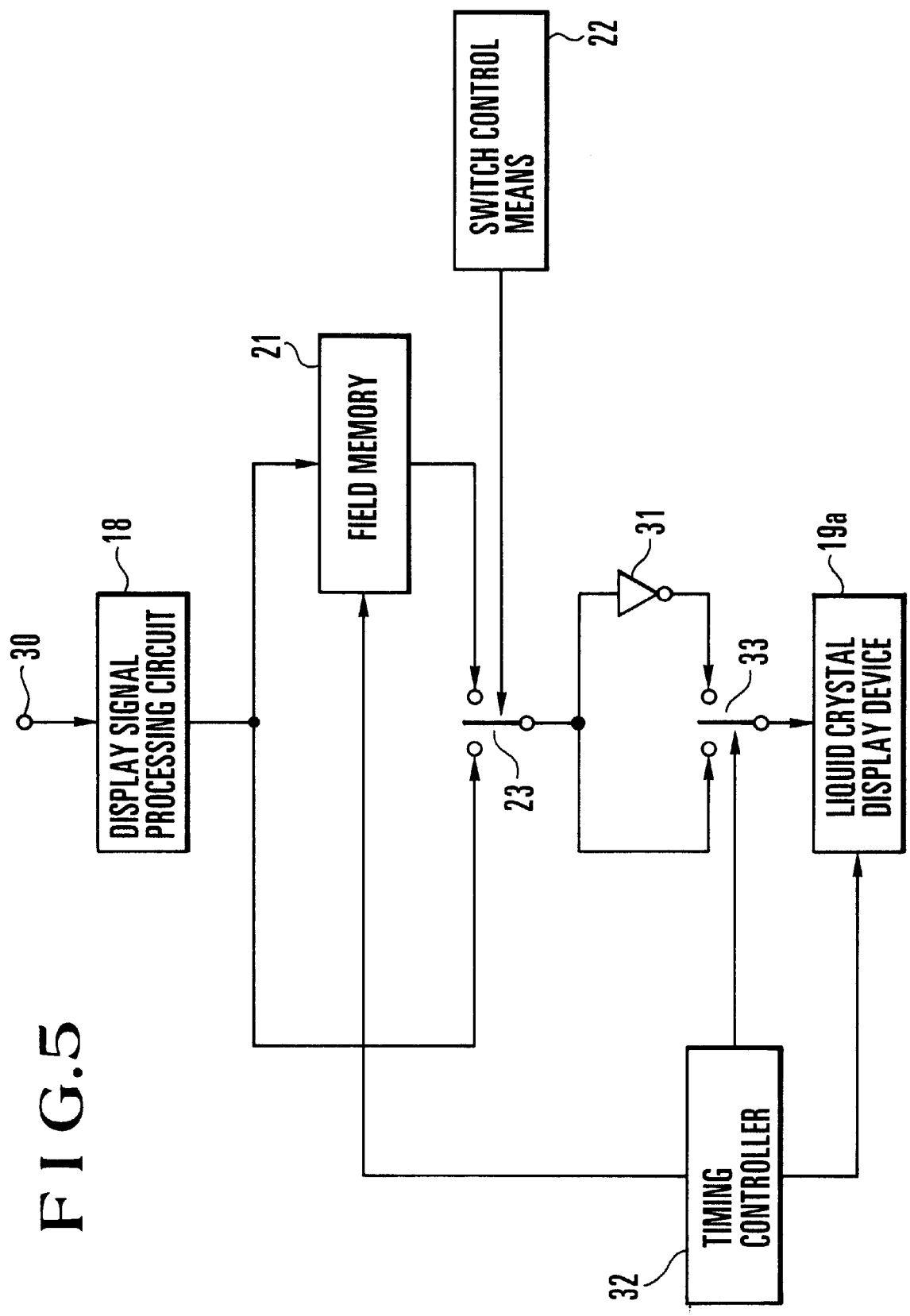
FIG. 5 is a block diagram showing the construction of an electronic camera according to a fourth embodiment of the present invention.

A fourth embodiment which can be applied to this kind of liquid crystal display device will be described below with reference to FIGS. 5 and 6. In FIG. 5, the same reference numerals are used to denote constituent elements common to those shown in FIGS. 2, 3 and 4, and the detailed description thereof is omitted. FIG. 5 is a block diagram showing the essential portion of an electronic camera which includes a liquid crystal display device according to the fourth embodiment, and reference numeral 30 denotes a terminal to which input a video signal outputted from the recording/reproduction switch circuit 16 used in each of the embodiments shown in FIGS. 2, 3 and 4, i.e., an interlaced-scanning video signal conforming to the television signal format. In addition, any of the switch control means 22 shown in FIGS. 2, 3 and 4 can be used as that shown in FIG. 5.

The apparatus shown in FIG. 5 also includes a liquid crystal display device 19a which requires driving for level inversion, an inverter 31 for inverting the level of the video signal, an inverting switch 33 for selectively outputting the output of the inverter 31 and the output of the recording/reproduction switch circuit 23, and a timing controller 32 for controlling the reading timing of the field memory 21, the operating timing of the inverting switch 33 and the driving timing of the liquid crystal display device 19a. The operation of the apparatus shown in FIG. 5 will be described below with reference to the timing chart of FIG. 6.

Figure 6:
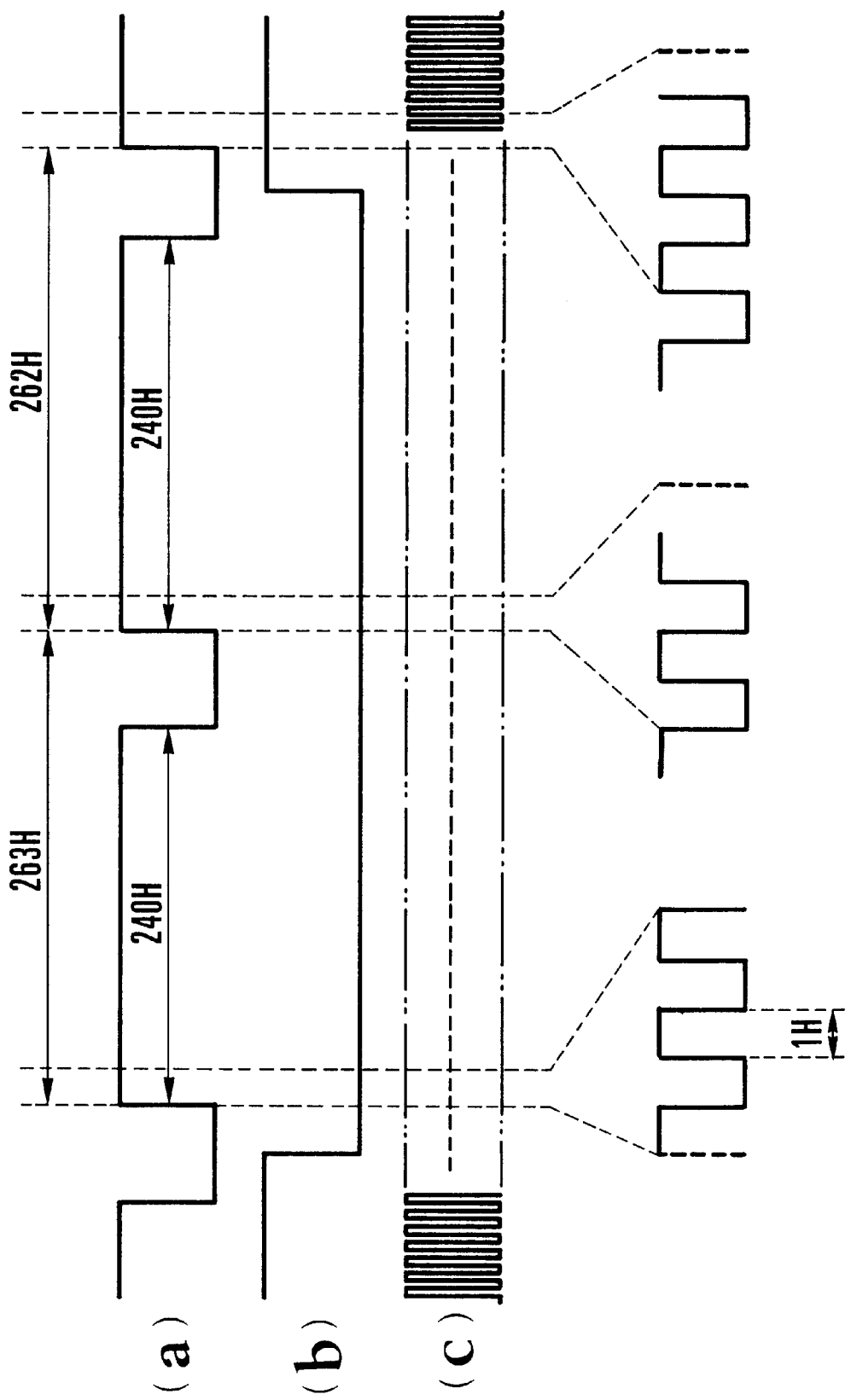
FIG. 6 is a timing chart aiding in describing the operation of the electronic camera shown in FIG. 5.

In FIG. 6, the high level (H) of a waveform (a) indicates the period during which the timing controller 32 brings the field memory 21 into a write or read enable state and the liquid crystal display device 19a is driven, while the low level (L) of the waveform (a) indicates the period during which the field memory 21 does not perform writing nor reading and the liquid crystal display device 19a is not driven. A waveform (b) indicates a signal which is inverted at intervals of one frame, and a waveform (c) indicates a control signal for the inverting switch 33.

As shown, 263 H corresponds to the period from the moment that the liquid crystal display device 19a starts to display a video signal for 240 H of a first (odd) field until the moment that the liquid crystal display device 19a starts to display a video signal for 240 H of a second (even) field, and 262 H corresponds to the period from the moment that the liquid crystal display device 19a starts to display a video signal for 240 H of the second field until the moment that the liquid crystal display device 19a starts to display a video signal for 240 H of the first field. Accordingly, by applying to the inverting switch 33 a rectangular-waveform signal which is inverted at intervals of 1 H, the video signal for 240 H of the first field and the video signal for 240 H of the second field are supplied to the liquid crystal display device 19a in the state of being inverted with respect to each other.

In the case of the video signal of the second field of a particular frame and the video signal of the first field of the next frame, if the aforesaid rectangular-waveform signal which is inverted at intervals of 1 H is simply applied to the inverting switch 33, both video signals will be supplied to the liquid crystal display device 19a in the state of being not inverted with respect to each other. For this reason, the control signal (c) to be actually applied from the timing controller 32 to the inverting switch 33 is obtained by carrying out the exclusive-OR between the rectangular-waveform signal which is inverted at intervals of 1 H and a rectangular-waveform signal which is inverted at intervals of one frame as shown by the waveform (b) of FIG. 6. By driving the inverting switch 33 and the liquid crystal display device 19a in this manner, the video signals to be supplied to the liquid crystal display device 19a are inverted at intervals of 1 H, and in addition the video signals of adjacent fields to be applied to the same display elements are also inverted, whereby it is possible to completely prevent burn-in from occurring in the liquid crystal display device 19a.

If a still image is to be displayed by using the field memory 21, for example, in the case of the first field of a particular frame, the field memory 21 is brought into a write enable state during the period in which the signal (a) of FIG. 6 is at its high level, and in the case of the second field, the field memory 21 is brought into a read enable state during the period in which the signal (a) of FIG. 6 is at the high level. Subsequently, by bringing the field memory 21 into the read enable state during the period in which the signal (a) of FIG. 6 is at the high level, it is possible to display the still image without involving flicker nor causing burn-in in the liquid crystal display device 19a.

As is apparent from the foregoing description, according to the above-described embodiments, there are provided two display modes which are switchable therebetween, i.e., a first display mode for alternately displaying an odd field image and an even field image at intervals of one field and a second display mode for consecutively displaying either one of an odd field image and an even field image at intervals of a two-field period. Accordingly, by switching the two display modes according to the content of an image to be displayed, it is possible to selectively ensure the resolution of the image and prevent a vertical image shake of the image.

In addition, there are provided the determining means for determining whether an image to be displayed is a moving image or a still image, and an optimum display mode is selected on the basis of a decision result provided by the determining means. Accordingly, for example, if an image to be displayed is a moving image, the image is displayed in the frame display mode, whereas if an image to be displayed is a still image, the image is displayed in the field display mode. Thus, it is possible to display an image in an optimum display mode suited to the kind of image to be displayed.

In addition, in a case where a still image is recorded and reproduced, during recording, a moving image which is being picked up is displayed in the first display mode, and, during reproduction, a reproduced still image is displayed in the second display mode. Accordingly, it is possible to automatically display an image in an optimum display mode according to either of the recording and reproduction modes.

What is claimed is:

1. A video signal processing apparatus comprising:
   (a) input means for inputting a video signal in which one frame is composed of a plurality of fields and scanning lines are interlaced among the plurality of fields;
   (b) processing means for processing the video signal inputted by said input means, said processing means selectively taking a first mode for sequentially outputting video signals of a plurality of fields of a frame and a second mode for consecutively outputting a video signal of one of the plurality of fields a plurality of times; and
   (c) output means for outputting the video signal processed by said processing means to a display device having displayable scanning lines the number of which is smaller than the number of scanning lines per field of the input video signal.

2. An apparatus according to claim 1, further comprising switching means for switching said processing means between said first mode and said second mode.

3. An apparatus according to claim 2, wherein said switching means operates according to a manual operation.

4. An apparatus according to claim 2, wherein said switching means includes determining means for determining whether the input video signal is a moving-image signal or a still-image signal, and operates according to an output from said determining means.

5. An apparatus according to claim 4, wherein said determining means operates by detecting whether the input video signal has a motion.

6. An apparatus according to claim 2, wherein said input means includes selecting means for selectively inputting a video signal to be recorded by a recording and reproducing device and a video signal reproduced by said recording and reproducing device.

7. An apparatus according to claim 6, wherein said switching means and said selecting means interlock with each other.

8. An apparatus according to claim 6, wherein said recording and reproducing device both records and reproduces the video signal to be recorded, as a still-image signal.

9. An apparatus according to claim 1, wherein said processing means includes at least a memory and is arranged to read, when in said second mode, a video signal of one field recorded in said memory and consecutively output the video signal of one field by a plurality of times.

10. A video signal processing method comprising the steps of:
    (a) inputting a video signal in which one frame is composed of a plurality of fields and scanning lines are interlaced among the plurality of fields;
    (b) processing the input video signal, said processing step selectively taking a first mode for sequentially outputting video signals of a plurality of fields of a frame and a second mode for consecutively outputting a video signal of one of the plurality of fields a plurality of times; and
    (c) outputting the video signal processed in said processing step to a display device having displayable scanning lines the number of which is smaller than the number of scanning lines per field of the input video signal.

11. A method according to claim 10, wherein either one of said first mode and said second mode is selected according to a manual operation.

12. A method according to claim 10, wherein either one of said first mode and said second mode is selected according to whether the input video signal is a moving-image signal or a still-image signal.

13. A display device comprising:
    (a) input means for inputting a video signal in which one frame is composed of a plurality of fields and scanning lines are interlaced among the plurality of fields;
    (b) processing means for processing the video signal inputted by said input means, said processing means selectively taking a first mode for sequentially outputting video signals of a plurality of fields of a frame and a second mode for consecutively outputting a video signal of one of the plurality of fields a plurality of times; and
    (c) displaying means, having displayable scanning lines the number of which is smaller than the number of scanning lines per field of the input video signal, for displaying the video signal processed by said processing means.

14. A device according to claim 13, further comprising switching means for switching said processing means between said first mode and said second mode according to a manual operation.

15. A device according to claim 13, further comprising switching means for switching said processing means between said first mode and said second mode according to whether the input video signal is a moving-image signal or a still-image signal.

16. A device according to claim 13, wherein said input means includes selecting means for selectively inputting a video signal to be recorded by a recording and reproducing device and a video signal reproduced by said recording and reproducing device, and said display device further comprises switching means for switching said processing means between said first mode and said second mode according to an operation of said selecting means.

17. A device according to claim 13, wherein said processing means includes at least a memory and is arranged to read, when in said second mode, a video signal of one field recorded in said memory and consecutively output the video signal of one field by a plurality of times.

18. A device according to claim 17, wherein said displaying means is driven when said memory is placed in a write or read enable state.

19. A device according to claim 18, wherein said processing means outputs to said displaying means a video signal which is inverted at intervals of one horizontal scanning period.

20. A video signal processing apparatus comprising:
    (a) input means for inputting a video signal in which one frame includes two fields and scanning lines are interlaced among the two fields;
    (b) processing means for processing the video signal inputted by said input means, said processing means selectively taking a first mode for sequentially outputting two fields of video signals and a second mode for consecutively outputting a video signal of one of the two fields a plurality of times; and (c) outputting means for inverting the video signal processed by said processing means at predetermined intervals and for outputting the inverted video signal to a display device.

21. An apparatus according to claim 20, wherein said outputting means inverts the video signal so that video signals of the two fields displayed in the same portion of the display device have opposite polarity.

22. An apparatus according to claim 20, wherein said predetermined interval corresponds to one horizontal scanning period.

23. A video signal processing method comprising the steps of:
    (a) inputting a video signal in which one frame includes two fields and scanning lines are interlaced among the two fields;
    (b) processing the video signal, said processing step selectively taking a first mode for sequentially outputting two fields of video signals and a second mode for consecutively outputting a video signal of one of the two fields a plurality of times;
    (c) inverting the video signal processed in said processing steps at predetermined intervals; and
    (d) outputting the video signal inverted in said inverting step to a display device.

24. A method according to claim 23, wherein said inverting step inverts the video signal so that video signals of the two fields displayed in the same portion of the display device have opposite polarity.

25. A method according to claim 24, wherein said predetermined interval corresponds to one horizontal scanning period.

26. A display device comprising:
    (a) input means for inputting a video signal in which one frame includes two fields and scanning lines are interlaced among the two fields;
    (b) processing means for processing the video signal inputted by said input means, said processing means selectively taking a first mode for sequentially outputting two fields of video signals and a second mode for consecutively outputting a video signal of one of the two fields a plurality of times;
    (c) inverting means for inverting the video signal processed by said processing means at predetermined intervals; and
    (d) display means for displaying the inverted video signal inverted by said inverting means to a display device.

27. A device according to claim 26, wherein said inverting means inverts the video signal so that video signals of the two fields displayed in the same portion of the display device have opposite polarity.

28. A device according to claim 26, wherein said predetermined interval corresponds to one horizontal scanning period.

29. A video signal processing apparatus comprising:
    (a) input means for inputting video information corresponding to one picture which includes a plurality of portions of the picture, each portion of the picture consisting of lines equally located in the picture;
    (b) processing means for processing the video information inputted by said input means, said processing means selectively taking a first mode for outputting all of the plurality of portions of the picture and a second mode for outputting one of the plurality of portions of the picture a plurality of times; and
    (c) output means for outputting the video information processed by said processing means to a display device having scanning lines the number of which is smaller than the number of lines of each of the portions of the picture.

30. An apparatus according to claim 29, wherein said output means outputs the video information so that signals corresponding to the same portion of the display device have an opposite polarity.

31. An apparatus according to claim 29, wherein said input means inputs the plurality of portions sequentially.

32. A video signal processing method comprising the steps of:
    (a) inputting video information corresponding to one picture which includes a plurality of portions of the picture, each portion of the picture consisting of lines equally located in the picture;
    (b) processing the video information inputted by said input means to output all of the plurality of portions of the picture in a first mode and to output one of the plurality of portions of the picture a plurality of times in a second mode; and
    (c) outputting the video information processed by said processing means to a display device having scanning lines the number of which is smaller than the number of lines of each of the portions of the picture.

33. A method according to claim 32, wherein the video information is inverted in said outputting step so that video signals of the plurality of portions displayed in the same location of the display device has an opposite polarity.

34. A method according to claim 33, wherein the video information is inverted at a predetermined interval corresponding to one horizontal scanning period of the video information.

35. A method according to claim 32, wherein the plurality of portions of the video information are sequentially inputted in said inputting step.

36. A display device comprising:
    (a) input means for inputting video information corresponding to one picture which includes a plurality of portions of the picture, each portion of the picture consisting of lines equally located in the picture;
    (b) processing means for processing the video information inputted by said input means, said processing means selectively taking a first mode for outputting the plurality of portions of video information and a second mode for outputting one of the plurality of portions of the video information a plurality of times; and
    (c) display means for displaying the video information processed by said processing means.

37. A device according to claim 36, wherein said processing means inverts the video information so that video information of the plurality of portions displayed in the same location of the display device has an opposite polarity.

38. A device according to claim 37, wherein said process means inverts the video information at a predetermined interval corresponding to one horizontal scanning period of the video information.

39. A device according to claim 36, wherein said input means inputs the plurality of portions of the video information sequentially.

* * * * *